United States Patent [19]
Yonehara

[11] Patent Number: 5,257,847
[45] Date of Patent: Nov. 2, 1993

[54] SHROUDED TRUCK STEP KIT

[75] Inventor: Paul T. Yonehara, Buena Park, Calif.

[73] Assignee: Pacific Auto Accessories, Inc., Huntington Beach, Calif.

[21] Appl. No.: 911,706

[22] Filed: Jul. 10, 1992

[51] Int. Cl.⁵ .............................. B60J 5/00; B60R 3/02
[52] U.S. Cl. ..................................... 296/151; 280/163
[58] Field of Search ................ 296/151; 280/163, 166

[56] References Cited

U.S. PATENT DOCUMENTS

| | | | |
|---|---|---|---|
| 2,255,880 | 9/1941 | Gregorie | 296/151 |
| 2,312,812 | 3/1943 | Geyer | 296/151 |
| 3,140,891 | 7/1964 | Shreffler | 296/1 |
| 3,684,311 | 8/1972 | Pierce | 280/152 |
| 3,907,357 | 9/1975 | Davis, Jr. | 296/151 |
| 4,017,093 | 4/1977 | Stecker, Sr. | 280/163 |
| 4,021,055 | 5/1977 | Okland | 280/153 |
| 4,167,272 | 9/1979 | Wright | 280/163 |
| 4,203,611 | 5/1980 | Makela | 280/163 |
| 4,257,620 | 3/1981 | Okland | 280/153 |
| 4,311,320 | 1/1982 | Waters | 280/163 |
| 4,451,063 | 5/1984 | Snyder | 280/163 |
| 4,456,275 | 6/1984 | Snyder et al. | 280/163 |
| 4,463,962 | 8/1984 | Snyder | 280/164 |
| 4,607,878 | 8/1986 | Itoh | 296/199 |
| 4,838,567 | 6/1989 | Michanczyk | 280/163 |
| 4,934,721 | 6/1990 | Flores | 280/169 |

*Primary Examiner*—Robert R. Song
*Attorney, Agent, or Firm*—Fulwider, Patton Lee & Utecht

[57] ABSTRACT

A kit including an elongated planar step disposed beneath the lower edge of a truck cab door, mounted from the chassis and shrouded by a skirt attached to such door and projecting downwardly to terminate in a bottom edge disposed in confronting relation over the outboard edge of such step.

10 Claims, 3 Drawing Sheets

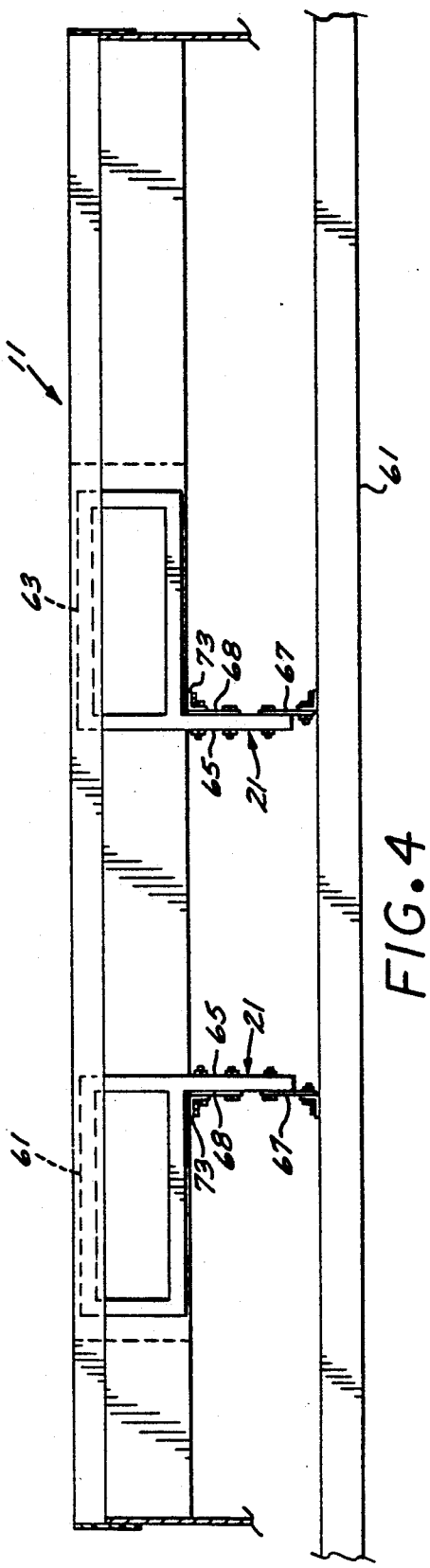
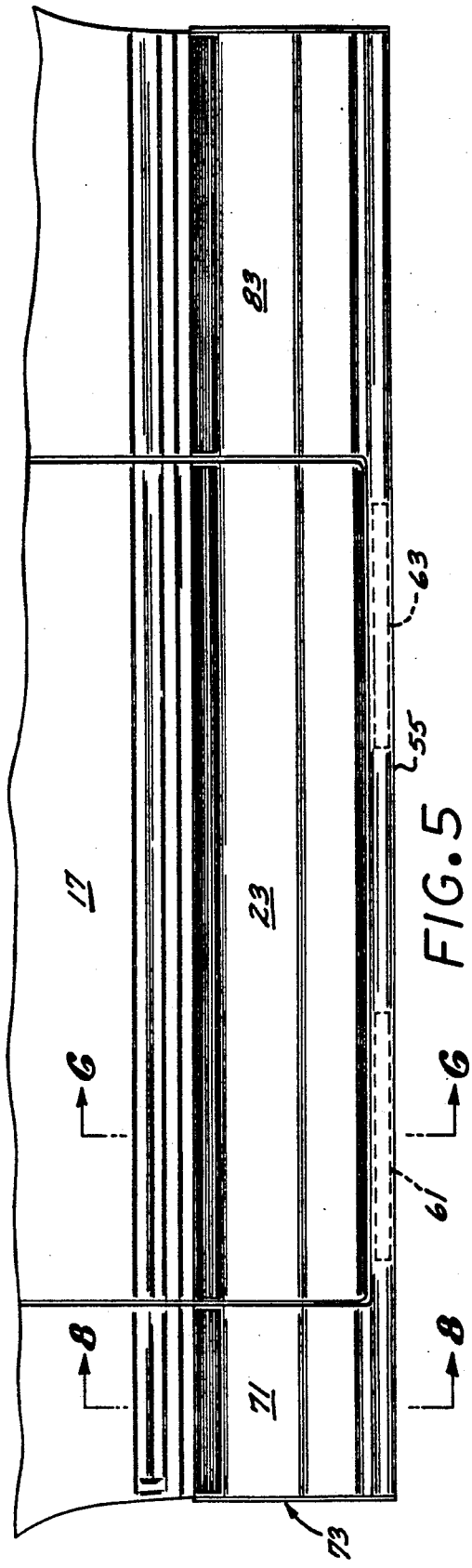
FIG.4
FIG.5

SHROUDED TRUCK STEP KIT

BACKGROUND OF THE INVENTION

1. Field of the Invention

The invention relates to a running board type step for mounting from the chassis of a truck cab.

2. Description of the Prior Art

Trucks or pickups have gained popularity as passenger vehicles. Much of such popularity is due to the aesthetics of the truck design. Such aesthetics have been enhanced by the addition of decorative ground effect skirts attached to the lower periphery of the vehicle body. Modern day truck designs typically incorporate a passenger floor board which is somewhat elevated from the ground thus requiring a high step by an entering passenger. Typically, such truck designs do not currently incorporate running boards which in the past have facilitated entry to such vehicles. The demand for design aesthetics has discouraged the use of running boards of the type which are exposed to view thus detracting from the sleek lines deemed pleasing by the purchasing public.

Examples of exposed running boards include those shown in U.S. Pat. Nos. 4,021,055; 4,167,272; 4,203,611; 4,257,620; 4,311,320; 4,451,063; 4,456,275; 4,463,962; 4,838,567; and 4,934,721.

U.S. Pat. No. 4,607,878 to Itoh discloses a synthetic resin rocker panel element for attachment to automobiles. While acceptable for its intended purpose, this arrangement fails to afford a meaningful weight bearing step concealed when the automobile door is closed.

U.S. Pat. No. 3,684,311 to Pierce shows a mud guard strip attachment for the rocker panel body area of an automobile but fails to provide for a weight bearing step attached to the automobile frame.

Consequently, there exists a need for a weight bearing running board type step to facilitate entry into the cab of a truck but which does not detract from the aesthetic appearance of the truck itself.

SUMMARY OF THE INVENTION

A step kit including a planar step deck attachable to a truck cab to be disposed beneath the level of the floor boards and spaced below the lower edge of the door, such apparatus being supported from the truck chassis by a cantilevered framework. A decorative skirt is connected to the bottom of the door and projects downwardly below the edge of the bottom edge of the door to terminate in a skirt edge disposed adjacent the lateral outer edge of the step to, when the door is closed, conceal such step from view.

Other objects and features of the invention will become apparent from consideration of the following description taken in conjunction with the accompany drawing.

BRIEF DESCRIPTION OF THE DRAWINGS

FIG. 4 is a partial broken bottom plan view, in enlarged scale, taken along the line 4—4 of FIG. 1;

FIG. 5 is a partial right hand side elevational view, in enlarged scale, taken from FIG. 1;

DESCRIPTION OF THE PREFERRED EMBODIMENT

Figure 1:
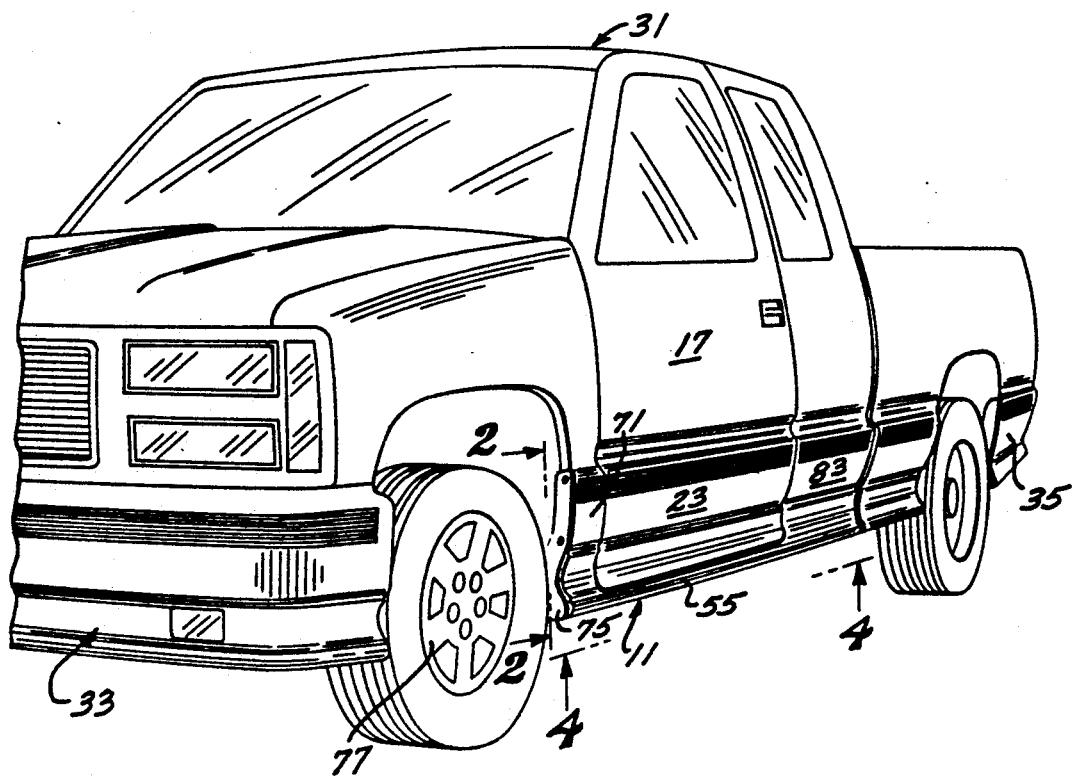
FIG. 1 is a perspective view of a truck incorporating an embodiment of the step apparatus of the present invention.
Figure 6:
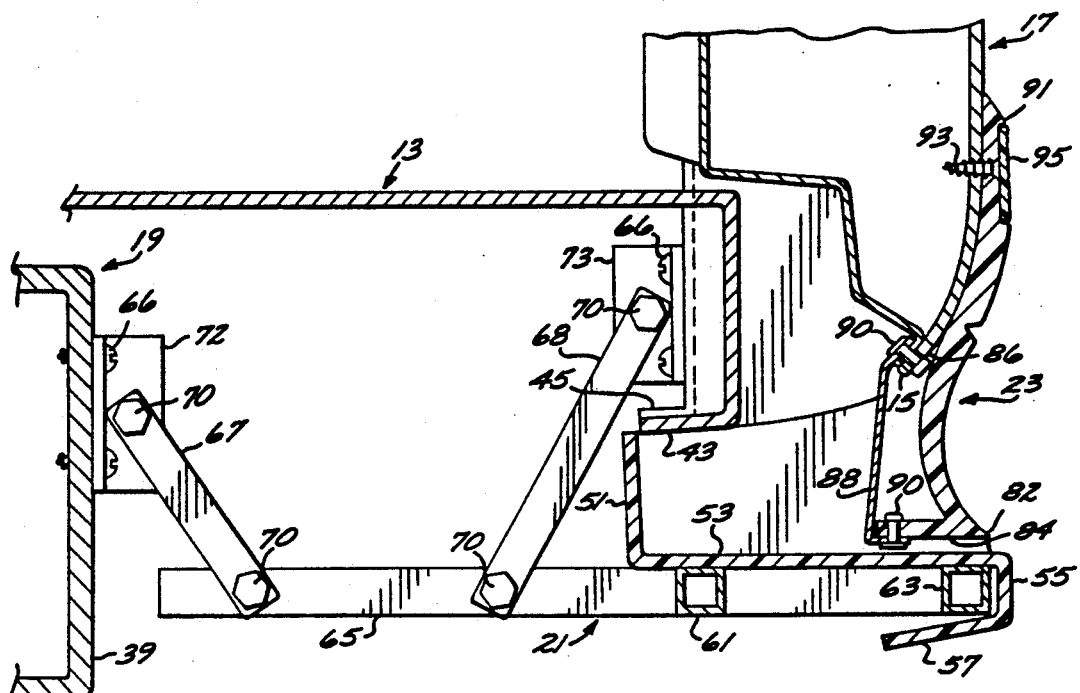
FIG. 6 is a vertical sectional view taken along the line 6—6 of FIG. 5.

Referring to FIGS. 1, 5 and 6, the step kit of the present invention includes, generally, a step device 11 disposed beneath the level of the truck cab floor board 13 to be spaced beneath the lower edge 15 of the cab door 17. The step is carried from the body of the truck cab but rests floatably on a framework of struts, generally designated 21 attached to the truck frame 19. A decorative skirt apparatus, generally designated 23, is carried from the door 17 and projects downwardly therebelow to shroud the step device 11 when the door is closed.

Referring to FIG. 1, modern day passenger trucks, of the type generally designated 31, are designed to provide aesthetic appeal and such design is oftentimes complimented by ground effect accessories, such as front dams 33 and side skirts, generally designated 35. It is a characteristic of many such truck designs that the truck bodies are elevated relative to the supporting axles thus raising the floor boards 13 (FIG. 6) of the cabs to a height which sometimes renders it inconvenient and awkward for a passenger to make entry. In some circumstances, the height of the passenger's step up to the floor board 13 can even create a dangerous situation which may result in a passenger endeavoring to enter the cab of such truck to inflict injury on himself as by straining muscles or the loss of balance resulting in a fall to the ground or against the truck structure which might result in personal physical injury.

Present day truck designs often do not incorporate exterior running boards to facilitate entry to the vehicle. It is believed in some circles that exterior steps or running boards detract from the physical appearance of the modern day designs thus discouraging their use. The present design is intended to overcome this shortcoming by providing a safety step device 11 attachable to the truck cab in such a manner that, when the cab door 17 is closed, it will be concealed from view by the skirt 23. The skirt itself blends in with the overall attractive appearance of the vehicle to cooperate in rendering a pleasing appearance. By constructing the apparatus such that it can be conveniently attached in an after market setting, considerable flexibility is provided for its use.

Figures 7, 8:
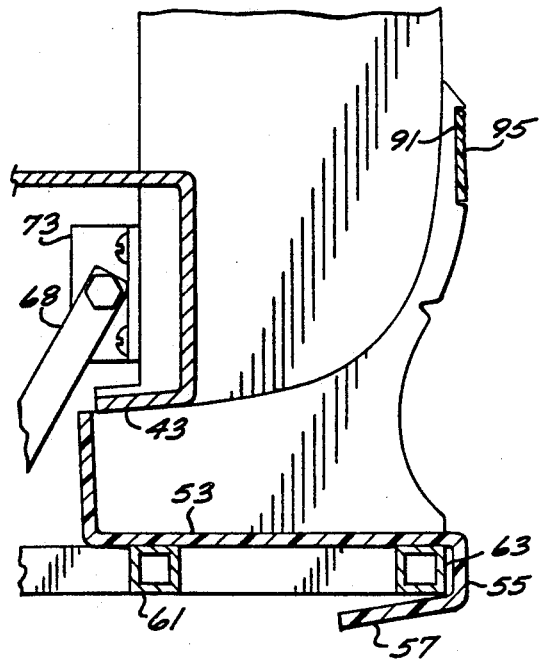
FIG. 7 is a vertical sectional view similar to FIG. 6 but with the truck door removed for clarity.
FIG. 8 is a vertical sectional view taken along the line 8—8 of FIG. 5.

Referring to FIGS. 6 and 7, pickup trucks 31 typically incorporate a chassis framework 19 which may include a longitudinal channel beam 39 from which the floor boards 13 are carried. The floor boards 13 are formed of heavy gauge sheet metal which may be turned downwardly at the outboard edge to extend downwardly and then turn back inwardly to form an inturned flange 43 on which a bracket 45 (FIG. 6) is supported.

The structure of the step device 11 in the preferred embodiment is made from a formed fiberglass sheet and incorporates an upturned interior longitudinal flange 51 (FIG. 6) and a planar horizontal step deck 53. The deck turns downwardly at its outer edge to form an exposed runner 55 extending beneath the door skirt 23. It then turns inwardly to form an inturned, longitudinal stiffening flange 57 which serves to facilitate capture of the lateral outer edge of the framework 21 as discussed hereinafter.

Referring to FIGS. 1 and 4, the strut work 21 includes a pair of longitudinally spaced apart laterally projecting arms 65 which mount at their outer ends respective support platforms formed by laterally spaced apart longitudinal rails 61 and 63. The arms 65 are carried on their inner extremities from the lower ends of respective angular hanger struts 67 and 68 mounted on their respective upper ends, by mounting bolts 70, to respective mounting brackets 72 and 73 carried from the respective beam 19 and the bracket 45 by self-threading mounting screws 66 (FIG. 6).

Figure 2:
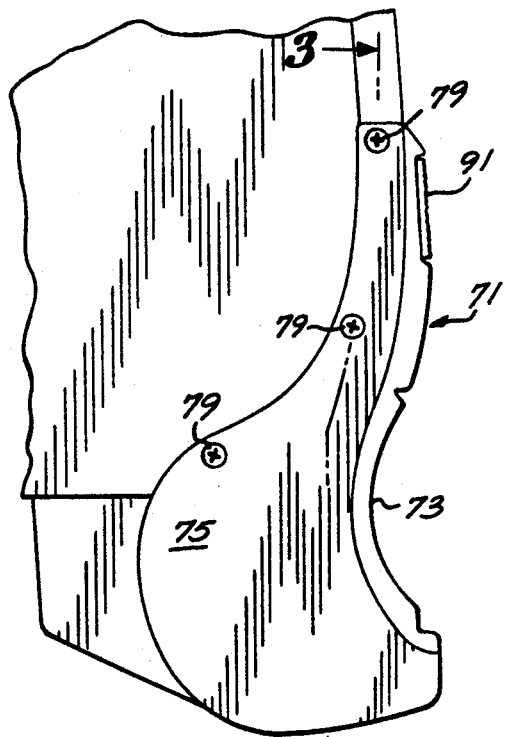
FIG. 2 is a partial elevational view, in enlarged scale, taken along the line 2—2 of FIG. 1.

The pickup truck 31 shown in the preferred embodiment incorporates the ground effect side skirt assemblies 35. The step device 11 includes at the front of the runner 55 and rearward of the forward wheel well an upwardly flared fender skirt panel, generally designated 71 which includes a formed sheet 23 flared upwardly from the level of the runner 55 and configured to complementally abut along its upper portion the fender rocker panel 70 (FIG. 8). The fender skirt extends downwardly and turns inwardly to form a bottom wall 74 which turns upwardly at its interior edge to form an inner wall 76 that, in turn, turns back outwardly to form a mounting flange 78. The mounting flange 78 is mounted to the flanges 80 of the fender structure by means of a mounting screw 82. The fender skirt is closed at its front end by a formed mud guard 75 (FIGS. 1 and 2) disposed immediately behind the front wheel 77 and fastened to the wheel well by means of fastening screws 79.

Formed integrally at the rear end of the bottom runner 55 is a cab skirt 83 disposed behind the door (FIG. 1).

The door skirt 23 is interposed between the fender skirt 71 and cab skirt 83 and is formed in its upper portion to complement the shape of the door rocker panel and projects below the lower edge thereof to turn sharply inwardly at 82 to form a flat bottom wall 84. The interior gap between such door skirt bottom wall and the bottom flange 86 of the door is then closed by a closure panel 88. Pop rivets 90 secure such closure panel along its bottom and top edges.

Referring to FIGS. 6, 7 and 8, the skirt panels 71, 23 and 83 are all formed in their exteriors with respective longitudinal grooves 91 which receive respective mounting screws 93 which screw into bores drilled in the sheet metal of the truck body to secure such skirt panels in position. If desirable, such skirt panels may be further bonded to the truck body. In the preferred embodiment decorative cover strips 95 are bonded in position overlying the heads of the mounting screws 93.

Figure 3:
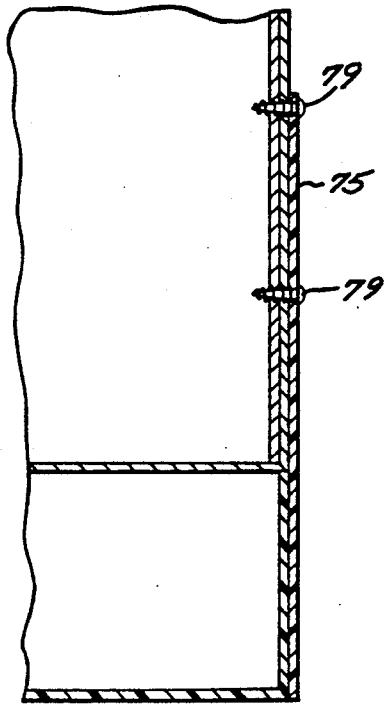
FIG. 3 is a vertical sectional view taken along the line 3—3 of FIG. 2.

In operation, it will be appreciated that the step device 11, strut framework 21, skirts 71, 23 and 83 and remaining components are typically packaged in kit form. The installer will remove the components from the packaging, inventory for missing parts, and commence installation. The framework 21 may be installed by drilling holes in the chassis beam 39 and flange 45 at locations spaced longitudinally apart (FIG. 4) for receipt of the self-tapping mounting screws 66 to mount the respective mounting brackets 71 and 73 in position. The cross arms 65 may then be suspended from such brackets by means of the struts 67 and 68. The step device 11 may then be positioned on the cantilevered frame arms 61 and 63 (FIG. 4) and secured in position by installation of the self-tapping mounting screws 93 (FIG. 6). If desirable, a bonding agent may be applied to the back side of the skirt panels 71, 23 and 83. The skirt 23 is then affixed to the bottom extremity of the door 17 by boring holes the use of self tapping screws or for the pop rivets 90 (FIG. 6) and inserting such rivets. The mud guard 75 is then installed by drilling holes for the self-tapping screws 79 (FIGS. 2 and 3) and the guard then secured in place. The finishing strips 95 (FIG. 6) may then be snapped or bonded into place in covering relation over the screws 93.

In some of the commercial embodiments an illuminating light is incorporated in the step device and connected in circuit with the interior lights to thereby be automatically actuated when the door is open.

It will be appreciated by those skilled in the art that with the subject construction, the step device thus provides a safety measure facilitating entry into and egress from the truck cab. The step deck 53 will, when the door 17 is closed, be shrouded from the exterior to complement the aesthetic appearance of the overall vehicle. During operation of the vehicle itself, it will be appreciated that the structural support afforded by the strut framework 21 will provide support to the undersurface of the step deck 53 (FIG. 6) while leaving the step itself and incorporated fender and body skirt panel 71 and 83 free to float and flex somewhat relative thereto thus accommodating relative shifting of those parts without application of undue stresses. When the door 17 is then opened, the area in front of the step deck 53 will be cleared for access thereto. When a passenger's weight is applied to the step deck 53, its tendency to flex downwardly will be restricted by the overall construction and interfitting of the step device relative to the strut framework. This support is enhanced by the capture of the rail 63 within the confines of the runner 55 and underlying flange 57 as viewed in FIG. 6.

It will be apparent from the foregoing that the step apparatus of the present invention provides a sturdy, reliable device for conveniently facilitating entry. Yet, when the cab door is closed, the step will be shrouded by the decorative skirt to present an eye appealing appearance to those viewing the cab from the exterior.

Various modifications and changes may be made with regard to the foregoing detailed description without departing from the spirit of the invention.

What is claimed is:

1. A step kit for mounting from the chassis of a truck cab of the type including at least one passenger door terminating in a lower edge to facilitate a passenger's entry to the cab floor and comprising:
   an elongated step device including a planar step deck spaced below the level of such cab floor and below the bottom edge of such door and projecting laterally inwardly from an outside edge;
   a support framework for supporting said step deck from such chassis;
   hangers for hanging said framework from such chassis;
   a skirt projecting along the bottom margin of said door and projecting downward to terminate in a skirt edge disposed, when said door closed, adjacent said outside edge of said planar step;
   fastening means for fastening said skirt to said door;
   whereby said framework may be hung from said chassis by said hangers to support said step and said skirt fastened to said door by fastening means to cause said skirt, when said door is closed, to be disposed in covering relationship over said step and, when said door is open, expose said step for access thereto by a passenger's foot.

2. A step kit according to claim 1 wherein:
said step device is formed integral with a rail disposed, when said door is closed, beneath the bottom of said door skirt and is further formed with vertically upwardly projecting fender and cab skirt panels disposed respectively forwardly of and rearwardly of said door and secured to said cab.

3. A step kit according to claim 1 wherein:
said step device includes a vertical flange disposed laterally inwardly on said step deck and a downturned flange at the lateral outer edge of said planar step to form a runner disposed below said door skirt.

4. A step kit according to claim 1 wherein:
said support framework includes a pair of laterally projecting arms mounted at their lateral inner ends to said chassis and positioned with the lateral outer extremities thereof disposed under said step deck.

5. A step kit according to claim 4 wherein:
said support framework includes mounting brackets for attachment to said chassis to hold said framework in place.

6. A step kit according to claim 1 for mounting on a truck including a front fender formed with an interiorly disposed mounting horizontal flange and wherein:
said step device is formed with a longitudinal rail disposed beneath said door skirt and includes a fender skirt device disposed forward of said door including a fender skirt turned in on its bottom extremity to form a laterally inwardly projecting bottom wall configured to turn upwardly to form a vertical interior wall and includes an outturned flange overlying said support flange, said device further including fasteners said outward and support flanges together.

7. A step kit according to claim 1 and adapted to be mounted on a truck including a laterally inwardly disposed frame member and a laterally outwardly disposed frame flange, and wherein:
said support framework includes a horizontally disposed frame to be disposed under said planar step and further includes a pair of laterally projecting support arms and two pairs of elongated struts adapted to be connected on their respective upper extremities to said frame member and frame flange, respectively, said struts being adapted to be connected on their respective bottom extremities in spaced apart relationship to said support arms.

8. A step kit according to claim 1 wherein:
said framework includes a planar platform disposed under said step deck, including a longitudinal outboard rail;
said step device includes a sheet defining said deck and then turning downwardly to wrap down on the outside of said rail and then turning back inwardly to form a bottom flange cooperating with said deck to constrain said rail.

9. A step kit for mounting from the chassis and cab of a truck to be disposed below the door thereof to facilitate a passenger's entry to the cab of such truck and comprising:
a pair of cross arms for disposition beneath said chassis for projecting under such door to form a platform therebelow;
a plurality of struts for mounting such cross arms from the chassis of such truck;
a strip defining step device including a step deck for overlying said platform, said step device including skirt members projecting forwardly and rearwardly of the door opening;
a door skirt for mounting to the lower portion of such door and projecting below the lower edge thereof to, when the door is closed, be disposed in overlying relationship with respect to said step deck; and
hangers for hanging said struts to said chassis and for fastening said strip to the body of said cab and said door skirt to said door whereby said kit may be installed on such truck to support said step from such chassis and the skirt from said door to shroud said step when the door is closed.

10. A step kit according to claim 9 wherein:
said platform includes a longitudinal outboard rail;
said step device includes a sheet defining said deck and then turning downwardly to wrap down on the outside of said rail and then turning back inwardly to form a bottom flange cooperating with said deck to constrain said rail.

* * * * *